SAKAE YAGI AND
YUZO URAGUCHI
INVENTORS

Sept. 12, 1961 SAKAE YAGI ET AL 2,999,795
METHOD AND APPARATUS FOR THE PURIFICATION OF HEAVY-WATER
Filed Nov. 21, 1955 2 Sheets-Sheet 2

SAKAE YAGI AND
YUZO URAGUCHI
INVENTORS

BY Wenderoth, Lind & Ponack
ATTORNEYS

2,999,795
METHOD AND APPARATUS FOR THE PURIFICATION OF HEAVY-WATER
Sakae Yagi, Meguro-ku, Tokyo, and Yuzo Uraguchi, Kawasaki-shi, Kanagawa-ken, Japan (both % Tokyo University, 1 Motofujicho, Bunkyo-ku, Tokyo, Japan)
Filed Nov. 21, 1955, Ser. No. 548,179
Claims priority, application Japan Dec. 3, 1954
5 Claims. (Cl. 202—45)

The present invention relates to a method of producing heavy water. It relates more particularly to a method of and an apparatus for obtaining a product having a high concentration of heavy water by concentrating natural water or water containing slightly concentrated heavy water.

According to the conventional apparatus or, for example, the most commonly used rectification today which uses steam for heating as explained later, a number of rectifying columns are connected in series and are operated so that the vapor coming out of the top of a lower rectifying column is returned to a preceding column after being condensed in a condenser, and each column has its own still which is heated by steam. The said apparatus requires a large amount of steam for heating, the building cost of each column is high, and the percentage of recovery of heavy water is quite low, that is to say, the concentration of heavy water in natural water which is fed into the apparatus is so low and the difference in volatility between light water and heavy water is so small that (i) an enormous amount of heat must be used, (ii) a large total surface area for heat transfer is required in stills to receive the said amount of heat, and (iii) since a large theoretical number of plates are required, large rectifying columns must be constructed.

As an improvement of the above method, there is a so-called vapor compression system such as is mentioned in "Survey of Heavy Water Production Process" by Manson Benedict of the International Conference on the Peaceful Uses of Atomic Energy C/cont. S/P/819 wherein the vapor coming out of the top of the column is led to a compressor, is compressed therein, has its condensation temperature raised and is then led to a still which is connected to the bottom of the said column, and in which the rectified liquid inside the still wall is heated from the outside of the wall while the heating medium itself is condensed, is driven out of the still and is drained through a heat exchanger in which the feed to the rectifying column is heated. In the said system, the difference in boiling points between light water and heavy water is so slight that the rectification can be effected with the consumption of a small amount of mechanical energy instead of feeding a large amount of heat energy. Thus, from the point of view of energy economy, the said system appears to be very economical. However, according to the said system, (i) since an enormous amount of heat must be conducted into the still, which itself is not excessively large, the temperature difference of heat transfer in the still cannot be small and therefore the compression ratio of the compressor must be large, (ii) in order to overcome the pressure drop of the long and large rectifying column, the compression ratio of the compressor must be larger and therefore the energy for operating the compressor must be further increased. Thus, the object of economizing energy cannot be fully attained. The size of the still in the said system must be larger than in the first said ordinary steam heating system. Since the heat exchanger must also be provided without any alteration of the conventional feed pretreating apparatus, the building cost will increase.

An object of the present invention is to provide a method of and an apparatus for producing heavy water with a favorable percentage of recovery of heavy water.

Another object of the present invention is to provide a heavy water producing apparatus which has a low operating cost.

Still another object of the present invention is to provide a heavy water producing apparatus the building cost of which is low.

Still another object of the present invention is to provide a heavy water producing method and apparatus whereby the economy of energy as claimed is achieved. Compressors corresponding to columns and having lower compression ratios are arranged in series in a heating medium feeding line instead of only one compressor having higher compression ratio and larger capacity, and after each compression, a substantial part of the compressed heating medium is separated to a feed to the corresponding column, while the rest is passed to a succeeding compressor.

Another object of the present invention is to provide an apparatus wherein a conventional amount of natural water can be treated in spite of the fact that no large still is provided, that the diameter and length of the rectifying column are small and that the relative size of the feed pretreating apparatus and heat exchanger are small.

The present invention is characterized in that several rectifying columns are connected in sequence, the vapor coming out of the top of the first column is utilized as a heating medium for each column being compressed by compressors provided in the supply conduit just before the heating medium is directed to a heating section of each column, and the vapor coming out of the top of each of the second and subsequent columns is fed to the bottom of the respective preceding column and is subjected to rectification in the preceding column. A part or the whole of the surface of rectifying pipes set in each rectifying column is used as a heat transfer surface. We have found that unexpectedly great advantages of reduced consumption of power, of increased recovery of heavy water, of decreased plant cost, and others, which will be clear from the description given hereinbelow in detail, have resulted by employing a system such as described above.

Figure 1:
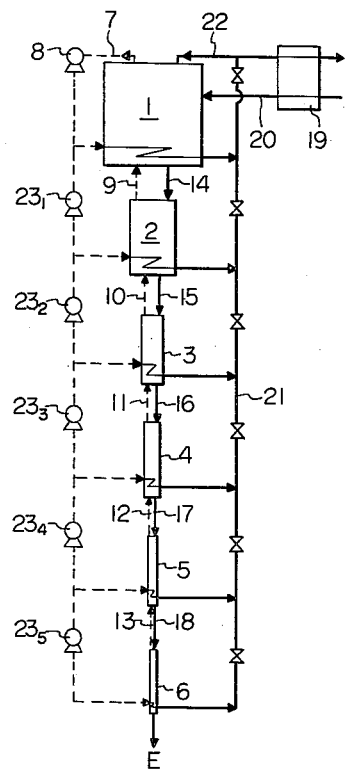
FIG. 1 is a schematic view of an apparatus adapted to practice the method of the present invention.

Referring to FIG. 1 showing the vapor compression system, 1, 2, 3, 4, 5 and 6 are rectifying columns. The vapor coming out of the top of the first column 1 is sent to vapor compressors 8, $23_1$, $23_2$, $23_3$, $23_4$ and $23_5$ through a pipe 7 and is compressed to a higher pressure and temperature. The compressed vapor is fed to each of the columns 1, 2, 3, 4, 5 and 6 and is utilized for heating. The vapor coming out of the top of each of the second column 2 and subsequent columns 3, 4, 5 and 6 is fed to the respective preceding column through pipes 9, 10, 11, 12 and 13, respectively, and is subjected to rectification. The liquid is fed to the subsequent columns through pipes 14, 15, 16, 17 and 18. Thus, the content of heavy water gradually increases until at last it is taken out as heavy water concentrate E.

As disclosed above, according to the present invention, the vapor coming out of the top of the first column 1 is compressed by means of the compressors 8 and $23_1$, $23_2$, $23_3$, $23_4$ and $23_5$ so as to be at a higher pressure and temperature and is utilized to heat the respective rectifying columns 1, 2, 3, 4, 5 and 6 by giving up heat during condensation within the columns. Therefore, there is no need for steam from outside the system for heating the respective columns. Thus, the amount of steam necessary is greatly reduced. According to the experiments made by the present inventors, the amount of steam required for a steam turbine to drive the vapor compressors 8 and $23_1$, $23_2$, $23_3$, $23_4$ and $23_5$ in the present invention is about one fifth the amount of vapor used in conventional systems. Furthermore, the recovery of heavy water is 10% or more, which is more than 2 times as much as that of the conventional method, i.e., 4% or less. It will be readily understood that great practical improvements are obtained even when rectifying is conducted under, for example, ordinary pressure which is a more unfavorable condition than the reduced pressure used in conventional processes.

Figure 2:
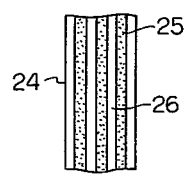
FIG. 2 shows the inside of a portion of a rectifying column.

Further, in the present invention, as shown in FIG. 2, tubes 25 filled with tower packings made of metal screens so that there is only a small pressure loss as gas passes through them and yet which have a large rectifying effect, are arranged within the rectifying column 24, and the vapor of higher pressure and temperature which has been compressed by vapor compressors 8, $23_1$, $23_2$, $23_3$, $23_4$ and $23_5$ is passed around the outside 26 of the said tube. A part or the whole of the wall of the tube 25 within the said column 24 is thus made a heat transfer surface so as to cause generation of rectifying vapor simultaneously with rectification. The still is therefore small or not required, the volume of the apparatus can be greatly reduced and the power consumed can also be greatly reduced.

According to the said construction, it is easy to increase the rectifying efficiency of the tower packings and to reduce the loss of pressure. Such construction is very effective in reducing the length of the rectifying column and also in reducing the power required for the compressor.

Further, according to the said construction, since the whole or a part of the enormous wall surfaces of the rectifying tubes below the feeding level can be utilized as heat transfer surfaces for the heat input required for the rectifying column, the temperature difference necessary for the transfer of the required heat input can be made smaller. Therefore, the power for the compressor will decrease. On the other hand, the still is small or not required. This is very effective in reducing the building cost of the apparatus.

In the rectifying column according to the present invention, since heavy water is further recovered in the part above the feeding level, the percentage of recovery of heavy water will increase remarkably and the amount of feed required will decrease remarkably. Therefore, the feed pretreating apparatus, feed preheating heat exchanger and other parts can be made quite small.

In the apparatus according to the present invention a number of compressors corresponding to the number of columns is used. All the vapor coming out of the top of the column is compressed in a compressor with a low compression ratio. Most of the compressed vapor is used to heat the rectifying tubes in the stripping section close to the feeding level. The rest of the compressed vapor is used to heat the rectifying tubes in the lower part of the stripping section. The pressure of the rest of the compressed vapor is raised in the succeeding compressors with low compression ratios and a part of it is drawn off after each compressor and fed to a rectifying column. By using such a system, the power required for the compressors can be remarkably reduced.

The present invention can be applied not only in the case where heavy water is to be concentrated from natural water but also in the case of slightly concentrated heavy water having a concentration of heavy water higher than that of natural water, which may be obtained, for example, by electrolysis, and the invention especially advantageous when used in the latter case.

Examples illustrative of the present invention are given in the following:

EXAMPLE 1

*Concentration of natural water*

An example in which heavy water concentrate is obtained from natural water at normal pressure by using six rectifying columns is as follows:

8941 kg. of water heated to 100° C. by the heat exchanger 19 were fed to the first column 1 during the period of an hour through the pipe 20, and the water from the first column 1 was fed in turn into the second column 2, third column 3, fourth column 4, fifth column 5 and sixth column 6 and rectified therein. The temperature within the rectifying column at that time was 100 to 120° C. The amount of vapor sent to the compressor 8 through the pipe 7 from the top of the first column 1 was 43,985 kg. per hour. The temperature thereof was 100° C. This vapor was compressed by the compressor 8 so that condensing temperature of the compressed vapor was 114° C. A major part of the vapor was fed to the first column 1 and was utilized as a heat source for heating the columns. The rest of the vapor was further compressed by the compressors $23_1$, $23_2$, $23_3$, $23_4$ and $23_5$ in turn so as to have condensing temperature of 114–124° C. and then was fed to the second column 2, third column 3, fourth column 4, fifth column 5 and sixth column 6, respectively, and was utilized as a heat source for heating the columns. Such vapor was condensed in the respective rectifying columns. The condensed water was at such a high temperature of 114 to 124° C. that a part thereof was sent to the heat exchanger 19 through the pipe 21 to heat the feed to 100° C. The rest of the condensed water was made to flow into the first column through the pipe 22.

By the operation as mentioned above, 1.25 kg. of 10% heavy water concentrate were obtained from the 8941 kg. of water. The amount of steam used to drive the compressors 8 and $23_1$–$23_5$ was 8500 kg.

EXAMPLE 2

*Concentration after preconcentration*

Figure 3:
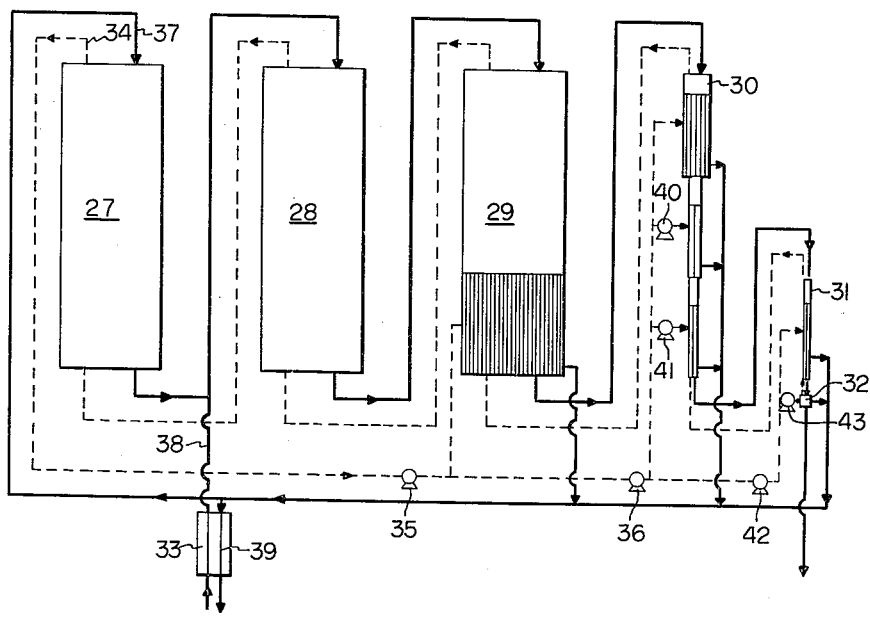
FIG. 3 is a schematic view of a practical apparatus for carrying out the method.

An example in which heavy water concentrate was obtained from concentrated heavy water of low concentration at normal pressure by using three rectifying columns is as follows:

Using the apparatus of FIG. 3, 173 kg. of 0.116% heavy water concentrate heated to 100° C. by the heat exchanger 23 were fed to the top part of the second compartment 28 (the first column comprises three compartments 27, 28 and 29) during the period of an hour through the pipe 38, the said concentrate being fed in turn into the second compartment 28, third compartment 29, the second column 30, the third column 31, and rectified therein. The temperature within the rectifying column at that time was 100 to 120° C. The amount of vapor sent to the compressor 35 through the pipe 34 from the top of the first compartment 27 was 5442 kg. per hour. The temperature thereof was 100° C. This vapor was compressed by the compressor 35 so that the condensing temperature was 116.6° C. A main part of the compressed vapor was fed to the lower part of the third compartment 29 and was utilized as a heat source for heating the column. The rest of the compressed vapor was compressed by the compressor 36.

The major part of the vapor from compressor 36 was fed to the upper part of the second column 30, and the balance of the vapor which did not go to the upper part of column 30 was further compressed by means of compressors 40, 41, 42 and 43, as seen in the drawing, to be fed respectively to the middle and bottom parts of the second column 30, the third column 31 and a small still 32. The vapor was utilized as a heat source for heating the columns. Such compressed vapor was condensed outside the tubes of the respective rectifying columns. The condensed water was at such a high temperature of 116.6 to 122° C. that a minor part thereof was sent to the heat exchanger 33 through the pipe 39 to heat the feed to 100° C.

The rest of the condensed water was made to flow to the top of the first compartment 27 of the first column through the pipe 37.

By the operation as mentioned above, 1.25 kg. of 10% heavy water concentrate were obtained from 173 kg. of 0.116% heavy water concentrate. The amount of steam used to drive the compressors 35, 36, 40, 41, 42 and 43 was 1200 kg.

Each of the first, second and third rectifying compartments 27, 28 and 29 of the first column, respectively, is 15 meters high and contains 260 tubes 7 cm. in internal diameter and filled with packings made of metal gauze. The second rectifying column 30 is as high as each of said compartments but contains fewer tubes. The third column 31 is shorter and contains fewer tubes.

We claim:

1. An apparatus for continuously producing heavy water concentrate which comprises at least three rectifying columns arranged in series, each rectifying column having a plurality of spaced tubes filled with tower packings through which downflow water flows, said water being heated from the outside of the tubes where compressed heating medium flows, means for feeding preheated feed water to the first column, means for withdrawing heavy water concentrate from the last column, connecting conduits connecting adjacent columns for causing the downflow water to flow from the first column to succeeding columns and to cause steam produced in said columns to flow in series through preceding columns, separate conduits connected to each column for passing a heating medium through each column in heat exchange relationship with said spaced tubes to heat the downflow water in the columns, a return conduit to which said separate conduits through which the heating medium passes are connected for returning waste heating medium from each column to the first column, a supply conduit connected to the other ends of said separate heating medium conduits passing through each column, said supply conduit connected to said last rectifying column and distributing the heating medium in the form of steam generated in the rectifying columns from the first rectifying column to each column, and compressors in said supply conduit preceding each heating conduit to give the heating medium energy necessary and sufficient for circulating the heating medium and heating the columns.

2. A method of producing heavy water concentrate comprising feeding feed water to the first of a series of at least three rectifying columns, each rectifying column having a plurality of spaced tubes filled with tower packings through which downflow water flows, said water being heated from outside of the tubes where compressed heating medium flows, feeding the downflow water in turn through succeeding columns, taking steam out of the top of each of the columns and feeding it to the bottom of the respective preceding columns into direct contact with the downflow water, recovering the heavy water concentrate coming out of the last column, combining condensates of heating medium from each column which condense while heating each column, returning a part thereof to the first column and feeding it as reflux water into direct contact with the steam rising in the column, passing the rest through a heat exchanger to heat the feed water being fed to the first column, and supplying the steam generated in the columns from said first column to the space between said spaced tubes and into indirect heat exchange relationship with the downflow water in each of said columns as heating medium, the portion of said steam entering each column being compressed before it enters each column a number of times equal to the number of the position of the column in said series of columns so that it absorbs energy necessary and sufficient for circulation and heating the columns.

3. A method as claimed in claim 2 in which the downflow water is natural water.

4. A method as claimed in claim 2 in which the downflow water is water containing slightly concentrated heavy water such as is obtained by electrolysis of natural water.

5. A method as claimed in claim 2 in which the steam generated in the columns is withdrawn from the top of the first column and most of the condensate of said steam utilized as a heating medium for each column is returned to the top of the first column, and the feed water is fed to the first column at a point well below the top of the column.

References Cited in the file of this patent

UNITED STATES PATENTS

| 2,208,573 | Fanske | July 23, 1940 |
| 2,300,985 | Smith | Nov. 3, 1942 |
| 2,449,587 | Chambers | Sept. 21, 1948 |

FOREIGN PATENTS

| 502,105 | France | May 5, 1920 |
| 340,708 | Germany | Sept. 14, 1919 |
| 249,860 | Switzerland | May 1, 1948 |

OTHER REFERENCES

Weissberger: "Distillation," 1951, pp. 175–179 and 198–200.

Selak et al.: "Chemical Engineering Progress," vol. 50, No. 5, pages 227, 228 (May 1954).